Nov. 17, 1925.

T. R. SWANNER

AUTOMOBILE JACK

Filed March 18, 1924   2 Sheets-Sheet 1

1,561,753

Inventor

Thomas Ray Swanner

By *[signature]*

Attorney

Nov. 17, 1925.  T. R. SWANNER  1,561,753
AUTOMOBILE JACK
Filed March 18, 1924    2 Sheets-Sheet 2

Inventor
Thomas Ray Swanner

Patented Nov. 17, 1925.

1,561,753

UNITED STATES PATENT OFFICE.

THOMAS R. SWANNER, OF LUVERNE, ALABAMA.

AUTOMOBILE JACK.

Application filed March 18, 1924. Serial No. 700,103.

*To all whom it may concern:*

Be it known that THOMAS R. SWANNER, a citizen of the United States of America, residing at Luverne, in the county of Crenshaw and State of Alabama, has invented new and useful Improvements in Automobile Jacks, of which the following is a specification.

It is well known that if the weight of an automobile is allowed to remain on the tires during the time the automobile is in storage, the tires deteriorate, in fact, they wear out where they engage with or rest upon the floor. Therefore, it is a purpose of the present invention to provide, in an automobile jack, a construction for jacking up the automobile, whereby the tires may be held out of contact with the floor, the tires then being deflated in order to prolong their life, it being obvious that when the automobile is in a raised position, the tires, while on the wheels, may be covered to additionally protect them.

Another purpose is to provide a jack of this character operative by the automobile to impart vertical movement to the lifting jack members, whereby the body of the automobile may be jacked up.

Still another purpose as well as an advantage is to provide a construction of jack which may be manufactured at a relatively low cost and sold at a reasonable profit.

A further purpose is to provide means on the lifting jack members to avoid contact with the truss rods and thereby protect the rods against injury while the lifting jack members engage with the axles.

A still further purpose is the provision of antifriction ball bearings which will permit the automobile to be more readily jacked up with the least possible friction.

It is further acknowledged that the present type of construction of lifting jack eliminates the use of levers or arms of any kind to impart movement to the various elements. Furthermore, the lifting jack herein disclosed may be adjusted to fit any automobile.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
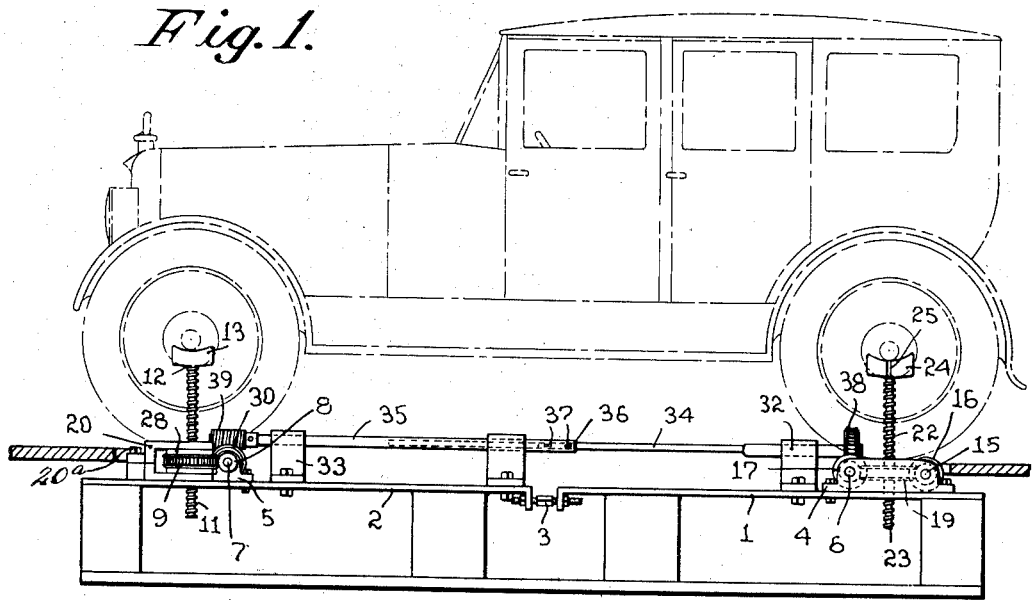
Figure 1 is a view in side elevation of the improved automobile jack constructed in accordance with the invention.
Figure 2:
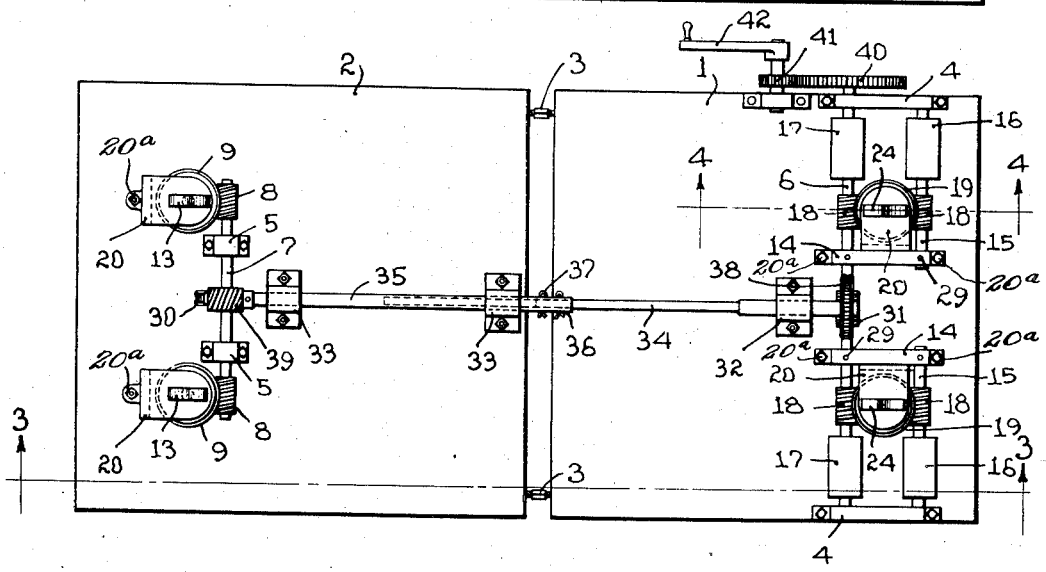
Figure 2 is a plan view of the same.
Figure 3:
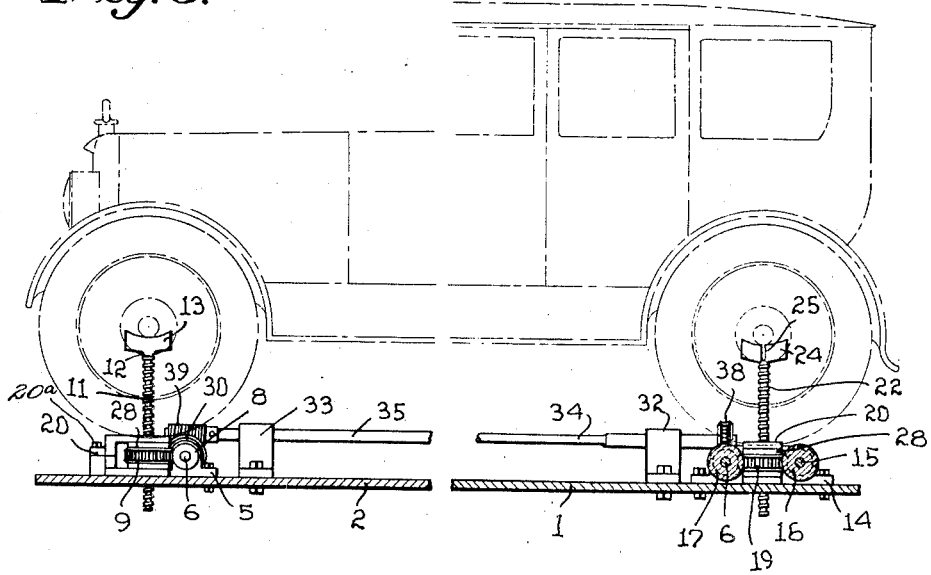
Figure 3 is a longitudinal sectional view on line 3—3 of Figure 2, showing the elements of construction and illustrating the automobile lifting jack members in their raised positions, thereby supporting the automobile.
Figure 4:
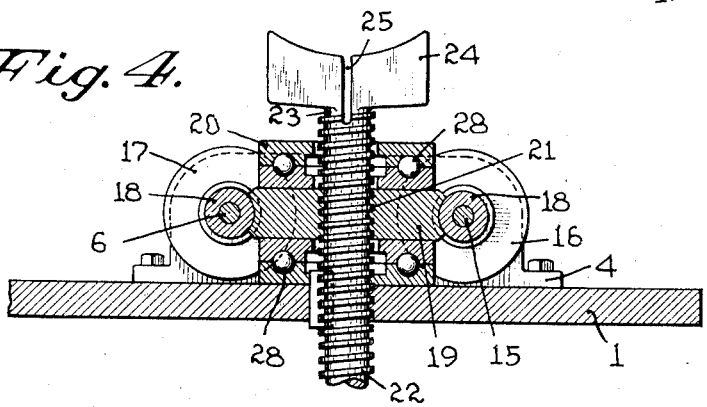
Figure 4 is an enlarged detail sectional view on line 4—4 of Figure 2, more clearly showing the construction of the automobile lifting jack members and their operative connections with the worms.
Figure 5:
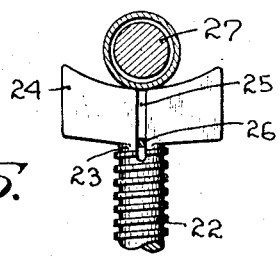
Figure 5 is an enlarged detail view of the upper end of one of the rear automobile lifting jack members showing the slot for the reception of the truss rod, thereby preventing distortion or bending of the rod and at the same time preventing the disengagement of the lifting jack member with the axle of the automobile.

Referring to the drawings, 1 and 2 designate the two sections of the base which may be adjusted longitudinally with relation to each other so as to accommodate automobiles of different wheel bases. These base sections may be held by devices 3 in different positions upon the stationary base. Rising from the base sections are bearings 4 and 5 for the shafts 6 and 7. The forward shaft 7 has worms 8 meshing with the worm wheels 9 which are mounted in housings to hold them in mesh with the worms 8.

The worm wheels 9 have spiral teeth or threads 10 which mesh with similar threads 11 on perpendicularly operated threads or rods 12 which are mounted in guides of the housings and through the base sections. The upper ends of the shafts or rods 12 have arcuate crotches or bearings 13 for engagement with the front axle of the automobile for causing the automobile to rise as a result of imparting vertical movements to the shafts or rods 12.

Frames 14 are carried by the rear shaft 6 and mounted in bearings of the frames are shafts 15. The shafts 15 are parallel with the shaft 6. Tread drums 16 and 17 are mounted in pairs on the shafts 6 and 15, so that when the rear wheels of an automobile engage with said drums, movement will be imparted to the shafts 6 and 15.

Worms 18 are mounted upon the shafts 6 and 15 and mesh with the worm wheels 19 which are also mounted in housings 20 similar to those used in front. The housings 20 are of similar general construction. They consist of the upper and lower sections which are bolted together, as at 20ª, which not only act to retain the adusting screw rods 23 positioned but also retain the ball bearings 28 in position, as well as retaining the worm wheels in place while in mesh with the worms. It is possible to release the nuts of the securing means 20ª, enabling the lifting screws to be quickly detached or removed without turning the worm wheels, sufficiently to warrant this detachment. In other words, by entirely removing the securing means 20ª, the two parts of the bearing may be moved away from the worms or back from between the worms and then the lifting screws 23 may be lifted or withdrawn from the base, the bearings and the worms being removed with the screw rods. This detachment of the parts is accomplished for the purpose of making repairs if at any time such are necessary. The worm wheels 19 have spiral threads or teeth 21 on the interiors of their bores which mesh with similar threads or teeth 22 of the rear automobile lifting jack rods 23 which are guided through the housings and through the base section 1. Obviously, as the worm wheels 19 rotate, the rods 23 move vertically and due to the arcuate crotches or bearings 24 at their upper ends, the rear part of the automobile is elevated.

The arcuate crotches or bearings 24 of the rear lifting jack rods 23 have slots 25 which straddle the truss rods 26 of the rear axle 27 of the automobile, that is, when the arcuate crotches or bearings engage with the axle for the purpose of lifting the rear end of the vehicle. In this way, the truss rods are prevented from injury, the truss rods, in turn, acting to prevent turning of the arcuate crotches or bearings as the vertical rods 23 raise and lower.

The housings for the worm wheels 9 and 19 have ball bearings 28 for said worm wheels to insure easy rotation of the worm wheels and thereby reduce the friction to a minimum.

The frames 14 have oil holes 29 for the reception of lubricant for the purpose of lubricating the shafts 6 and 15.

The forward shaft 7 has a worm wheel 30 while the rear shaft 6 has a worm 31. Mounted in bearings 32 and 33 of the base sections 1 and 2 are axially aligned shaft sections 34 and 35, the adjacent ends of which are telescopically united, as at 36, so that the two sections may rotate together and yet permit the sections to be axially adjustable, there being suitable bolts, pins or cotter keys 37 to hold the two shaft sections in different adjusted positions axially.

The rear end of the shaft section 34 carries a worm wheel 38 meshing with the worm 31 while the forward end of the shaft section 35 has a worm 39 meshing with the worm wheel 30. By constructing the shaft sections 34 and 35 adjustable axially, it is possible to adjust the lifting jack so as to accommodate automobiles with wheel bases of different sizes.

Obviously, when motion is transmitted to the tread drums, imparting revoluble movement to the shaft 6, revoluble movement is likewise imparted to the axially aligned shaft sections 34 and 35, thereby transmitting motion to the shaft 7 and hence causing the forward spiral perpendicular toothed rods to move vertically as well as imparting movement to the rear perpendicularly movable rods. In fact, the forward and rear perpendicularly movable rods are operated simultaneously so as to lift the automobile off of the four tires at one time.

The tread drums are roughened or toothed longitudinally so as to insure friction between the tires and the drums, thereby insuring transmitting motion to the drums through the medium of the drive wheels of the automobile.

It is obvious that the automobile may be lifted to substantially disengage the tires from the tread drums, thereby taking the weight of the machine from the tires, thus not only preserving the tires but also permitting them to be readily covered for the purpose of protecting them while the automobile may be in storage for a substantial period. To insure raising the automobile so as to entirely disengage the tires from the tread drums, one end of the shaft 6 has a gear 40 with which an additional gear 41 meshes, the latter having a handle 42 whereby power, if desired, may be applied to the shaft 6 by hand to lift the four wheels of the automobile entirely out of contact with the tread drums. However, this hand power is not absolutely necessary, it being shown merely for illustrative purposes.

The invention having been set forth, what is claimed is:

In an automobile lifting jack, the combination with a base, of forward and rear lifting jack screw rods, operating means for the jack screw rods, bearings for the jack screw rods, said bearings consisting of brackets, each bracket comprising upper and lower plates with a worm between the plates threaded upon the jack screw rod, the plates being disposed above and below the worm, each jack screw rod passing loosely through the base and similarly through the bearing, each bearing having ball bearings, and means for fastening the upper and lower plates of the bearings together and to the base detachably whereby, upon removing said securing means and moving said worms away from the jack screw operating means, the jack screw rods may be quickly and easily withdrawn from the base.

In testimony whereof he affixes his signature.

THOMAS R. SWANNER.